(12) United States Patent
Nukatsuka et al.

(10) Patent No.: US 8,972,203 B2
(45) Date of Patent: Mar. 3, 2015

(54) DISASTER-AFFECTED AREA ESTIMATION DEVICE AND PROGRAM

(75) Inventors: Shigehiro Nukatsuka, Tokyo (JP); Akiyoshi Sato, Tokyo (JP); Takeshi Adachi, Tokyo (JP); Kotaro Nariki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 471 days.

(21) Appl. No.: 13/391,786

(22) PCT Filed: Aug. 24, 2010

(86) PCT No.: PCT/JP2010/064232
§ 371 (c)(1),
(2), (4) Date: Feb. 22, 2012

(87) PCT Pub. No.: WO2011/030662
PCT Pub. Date: Mar. 17, 2011

(65) Prior Publication Data
US 2012/0158312 A1    Jun. 21, 2012

(30) Foreign Application Priority Data
Sep. 9, 2009 (JP) .................................. 2009-208098

(51) Int. Cl.
*G06F 19/00* (2011.01)
*G08B 21/12* (2006.01)
(Continued)

(52) U.S. Cl.
CPC ................ *G08B 21/12* (2013.01); *G06Q 10/04* (2013.01); *G08B 31/00* (2013.01)
USPC ................... 702/23; 702/24; 702/172; 705/4; 705/7.28; 340/500; 340/506; 340/522; 340/573.1

(58) Field of Classification Search
CPC ......... G06Q 10/04; G08B 31/00; G08B 21/12
USPC .......... 702/23, 24, 172; 705/4, 7.28; 340/500, 340/506, 522, 573.1
See application file for complete search history.

(56) References Cited

U.S. PATENT DOCUMENTS 5,861,820 A * 1/1999 Kerner et al. ................. 340/934
6,038,525 A * 3/2000 Maguire et al. ............... 702/172
(Continued)

FOREIGN PATENT DOCUMENTS

JP        62-40668 B2    8/1987
JP        11-326521 A    11/1999
(Continued)

OTHER PUBLICATIONS

International Search Report of PCT/JP2010/064232, mailing date of Oct. 19, 2010.
(Continued)

*Primary Examiner* — Carol S Tsai
(74) *Attorney, Agent, or Firm* — Westerman, Hattori, Daniels & Adrian, LLP (57) ABSTRACT

By using information collected on-site, estimation of a damage area at that time and also prediction regarding subsequent expansion of a disaster-affected area are performed. The estimation device includes a storage unit that stores an exposure calculation formula expressing an exposure amount, which is an integrated value of the concentration of a material with respect to time, at a certain time and a certain position, by using the diffusivity and flow rate of the material; an information-acquisition unit that acquires position information of disaster victims at a prescribed time as input information; and a calculation unit that obtains a critical value of the exposure amount by applying the position information of each disaster victim at the prescribed time to the exposure calculation formula and that specifies the disaster-affected area at the prescribed time on the basis of the exposure calculation formula for when the critical value is obtained.

8 Claims, 9 Drawing Sheets

(51) Int. Cl.
  *G06Q 10/04*  (2012.01)
  *G08B 31/00*  (2006.01)

(56) References Cited

U.S. PATENT DOCUMENTS

| | | | |
|---|---|---|---|
| 6,496,110 B2* | 12/2002 | Peterson et al. | 340/522 |
| 6,590,496 B2* | 7/2003 | Peterson et al. | 340/522 |
| 7,515,041 B2* | 4/2009 | Eisold et al. | 340/506 |
| 7,542,884 B2* | 6/2009 | Boris et al. | 703/2 |
| 8,145,439 B2* | 3/2012 | Gilbert et al. | 702/24 |
| 2002/0053978 A1* | 5/2002 | Peterson et al. | 340/573.1 |
| 2002/0084900 A1* | 7/2002 | Peterson et al. | 340/573.1 |
| 2007/0038383 A1* | 2/2007 | Boris et al. | 702/19 |
| 2008/0122609 A1* | 5/2008 | Mannisto et al. | 340/500 |
| 2009/0055103 A1* | 2/2009 | Gilbert et al. | 702/24 |
| 2011/0114412 A1* | 5/2011 | De Lorenzo et al. | 181/101 |
| 2011/0173045 A1* | 7/2011 | Jaine | 705/7.28 |

FOREIGN PATENT DOCUMENTS

| | | | |
|---|---|---|---|
| JP | 2001-42052 A | | 2/2001 |
| JP | 2003-307573 A | | 10/2003 |
| JP | 2005-292041 A | | 10/2005 |
| TW | 200714006 A | * | 4/2007 |

OTHER PUBLICATIONS

Japanese Decision to Grant a Patent dated Feb. 12, 2014, issued in corresponding Japanese Patent Application No. 2009-208098 (3 pages). The Decision to Grant a Patent has been received.

* cited by examiner

DISASTER-AFFECTED AREA ESTIMATION DEVICE AND PROGRAM

TECHNICAL FIELD

The present invention relates to a disaster-affected area estimation device and program that performs estimation of a disaster-affected area when a disaster occurs and that also performs prediction regarding the expansion thereof.

BACKGROUND ART

In the event of release of harmful materials due to an accident or terrorist attack, in the related art there have been proposals involving estimating the diffusion state of these harmful materials and implementing rescue, evacuation etc. Methods of predicting the diffusion state of such materials include the method disclosed, for example, in Patent Literature 1.

CITATION LIST

Patent Literature

{PTL 1} Japanese Unexamined Patent Application, Publication No. 2003-307573

SUMMARY OF INVENTION

Technical Problem

In the diffusion-state prediction method of the related art, disclosed in the above-cited Patent Literature 1 etc., as initial settings, it is necessary to input detailed information, such as the discharge source of the harmful materials, the types of harmful materials, weather data, and so forth.

However, at the disaster site, there is no opportunity to collect detailed and highly reliable information, such as the types of harmful materials, the discharge source, and so forth. Therefore, there is a need to ascertain the damage status as quickly as possible by using information that can be collected comparatively easily on-site, without the need for such detailed information, to rapidly estimate the disaster-affected area at that point in time, and to quickly perform prediction regarding subsequent expansion of the damage area.

The present invention has been conceived in light of the circumstances described above, and an object thereof is to provide a disaster-affected area estimation device and program in which, by using information that can be collected on site, it is possible to easily perform estimation of the damage area at that time and then prediction regarding subsequent expansion of the disaster-affected area.

Solution to Problem

In order to solve the above problems, the present invention employs the following solutions.

A first aspect of the present invention is a disaster-affected area estimation device for performing estimation of a disaster-affected area when a disaster occurs, including a storage unit that stores an exposure calculation formula expressing an exposure amount, which is an integrated value of the concentration of a material with respect to time, at a certain time and a certain position, by using a diffusivity and flow rate of the material; an information-acquisition unit that acquires position information of disaster victims at a prescribed time as input information; and a calculation unit that obtains a critical value of the exposure amount by applying the position information of each disaster victim at the prescribed time to the exposure calculation formula and that specifies the disaster-affected area at the prescribed time on the basis of the exposure calculation formula for when the critical value is obtained.

For example, when disaster victims have died at a certain position at the prescribed time, the exposure amount at that position can be regarded as being equal to or above the critical value of exposure posing a danger to human life. According to the present invention, by applying the position information of disaster victims (for example, casualties), as well as time information thereof (prescribed time), as the input information to the exposure calculation formula expressing the exposure amount at an arbitrary time and arbitrary position, the exposure amount at that time can be calculated, and this exposure amount can be regarded as being equal to or greater than the critical value of the exposure at least sufficient to pose a danger to human life. Thus, the estimated critical value of the exposure amount that poses a danger to human life is obtained by applying the position information of other disaster victims at the same time (prescribed time) to the above exposure calculation formula, and areas having exposure amounts equal to or greater than this critical value are estimated as being disaster-affected areas. Thus, according to the present invention, it is possible to readily estimate the disaster-affected area on the basis of the position information of disaster victims.

For example, for the position information of disaster victims at the prescribed time, at least three pieces of information are sufficient.

In the disaster-affected area estimation device described above, the calculation unit may calculate the exposure amount at the positions of all disaster victims at the prescribed time by using the exposure calculation formula and may define the minimum exposure amount among all of the calculated exposure amounts as the critical value.

According to the first aspect of the present invention, by using the exposure calculation formula, it is possible to easily and quickly estimate the disaster-affected area on the basis of the position information of the disaster victims.

In the disaster-affected area estimation device described above, the calculation unit may normalize the exposure amounts by dividing the exposure amounts by an amount of material released and may determine the critical value of the exposure amount by using a normalized formula.

By performing normalization in this way, it is possible to predict the progress of the damage area without specifying information about the type of chemical released or the amount released.

The disaster-affected area estimation device described may further include an output unit that outputs at least one of the exposure calculation formula for when the critical value is obtained and the estimated disaster-affected area.

Since at least one of the exposure calculation formula for when the critical value is obtained and the estimated disaster-affected area is output, it is possible to ascertain the disaster-affected area by displaying the disaster-affected area on a display device, and it is possible to use the exposure calculation formula for when the critical value is obtained in the prediction of the subsequent material diffusion.

The disaster-affected area estimation device described above may further comprise a disaster-affected-area expansion prediction unit that performs prediction regarding expansion of the disaster-affected area from the prescribed time onward, by substituting a time from the prescribed time onward into the exposure calculation formula for when the critical value is obtained.

By doing so, it is possible to easily predict not only the disaster-affected area at the prescribed time, but also how the disaster-affected area will expand from the prescribed time onward.

The disaster-affected area estimation device described above may further include a material-diffusion prediction unit that obtains a concentration diffusion equation by time differentiating the exposure calculation formula for when the critical value is obtained, that performs material diffusion analysis by using a concentration distribution at the prescribed time, obtained with this concentration diffusion equation, as an initial concentration distribution, and that performs material diffusion prediction for the prescribed time onward.

Thus, by performing diffusion prediction of the material from the prescribed time onward, it is possible to predict the expansion of the disaster-affected area from the prescribed time onward, even in a complex air-flow field.

The disaster-affected area estimation device described above may further include an origin specifying unit that determines, with reference to the prescribed time, a material release location before the prescribed time by using the exposure calculation formula for when the critical value is obtained.

When the disaster-affected area at the prescribed time is estimated, by going back in time, it is possible to specify the exposure conditions before the prescribed time. Accordingly, it is possible to estimate not only the disaster-affected area at the prescribed time, but also the disaster occurrence location where the material was discharged, as well as the time thereof.

For example, the origin specifying unit may specify the disaster occurrence location by determining the coordinates of the origin of the curve traced by the exposure calculation formula.

A second aspect of the present invention is a disaster-affected area estimation program for performing estimation of a disaster-affected area when a disaster occurs, the disaster-affected area estimation program causing a computer to execute information acquisition processing for acquiring position information of disaster victims at a prescribed time as input information; calculation processing for obtaining a critical value of an exposure amount by applying the position information of each disaster victim at the prescribed time to an exposure calculation formula expressing the exposure amount, which is an integrated value of a concentration of a material with respect to time, at a certain time and a certain position, by using a diffusivity and flow rate of the material, and for specifying the disaster-affected area at the prescribed time on the basis of the exposure calculation formula for when the critical value is obtained.

Advantageous Effects of Invention

The present invention affords an advantage in that it is possible, by using information that can be collected on-site, to estimate the damage area at that time and to easily perform prediction regarding subsequent expansion of the disaster-affected area.

DESCRIPTION OF EMBODIMENTS

First Embodiment

A first embodiment of a disaster-affected area estimation device and program according to the present invention will be described below with reference to the drawings.

First, before describing the concrete configuration of the disaster-affected area estimation device of the present invention, as well as the processing procedure thereof, some basic considerations regarding the disaster-affected area estimation of the present invention will be described.

First, under the assumptions of constant wind speed, flat land, and release over land, the diffusion equation for material discharged from a certain location is given, for example, by the Puff model represented by Equation (1) below. The Puff model is one atmospheric pollution diffusion model for predicting the diffusion state of a material that changes with time, and is a known model for determining the transport and diffusion at each point in time based on the amount of discharged material.

{Formula 1}

$$C(x, y, t) = \frac{\overline{Q}}{\sigma_x \sigma_y \sigma_z} \exp\left(-\frac{(x - Ut)^2}{2\sigma_x^2}\right) \exp\left(-\frac{y^2}{2\sigma_y^2}\right) \quad (1)$$

$$\overline{Q} \equiv \frac{2Q}{\sqrt{2\pi}^3}$$

In Equation (1) above, $\sigma$ indicates the diffusion width, Q indicates the amount released, and U indicates a uniform flow rate. In Equation (1) above, (x, y) is position, with the disaster occurrence location serving as the origin, where the x-axis is the airflow direction, and the y-axis is the direction perpendicular to the airflow direction; t is time, with reference to the time that the disaster occurred, and $\sigma_x$, $\sigma_y$, and $\sigma_z$ are diffusion widths (diffusivity) of the material in each axial direction.

The exposure amount is the value obtained by integrating the material concentration at a certain location with respect to time; therefore, it can be obtained by time integration of Equation (1) above, which represents the concentration. Thus, the exposure amount D can be given by Equation (2) below.

[Formula 2]

$$D(x, y, t) = \int_0^t C(x, y, t) dt \qquad (2)$$

$$= \frac{\overline{Q}}{\sigma_x \sigma_y \sigma_z} \exp\left(-\frac{y^2}{2\sigma_y^2}\right) \int_0^t \exp\left(-\frac{(x-Ut)^2}{2\sigma_x^2}\right) dt$$

$$= \frac{\overline{Q}}{\sigma_y \sigma_z U} \exp\left(-\frac{y^2}{2\sigma_y^2}\right) \int_\xi^{\xi_0} \exp\left(-\frac{\xi^2}{2}\right) d\xi$$

$$\xi \equiv \frac{x - Ut}{\sigma_x}, \xi_0 \equiv \frac{x}{\sigma_x}$$

Furthermore, in this embodiment, by dividing the exposure amount D represented by Equation (2) above by the amount of material released Q, the exposure calculation formula represented by Equation (2) is transformed to a normalized expression f(x, y, t). When the value obtained by dividing the exposure amount D by the amount of material released Q is defined as an exposure characteristic value K (hereinafter referred to as "K value") the expression f(x, y, t) and this K value are given by Equation (3).

{Formula 3}

$$K \equiv \frac{D}{Q} = \frac{1}{\sigma_y \sigma_z U} \exp\left(-\frac{y^2}{2\sigma_y^2}\right) c(x, t) \qquad (3)$$

$$= f(x, y, t)$$

$$c(x, t) \equiv \int_\xi^{\xi_0} \exp\left(-\frac{\xi^2}{2}\right) d\xi$$

Figure 3A:
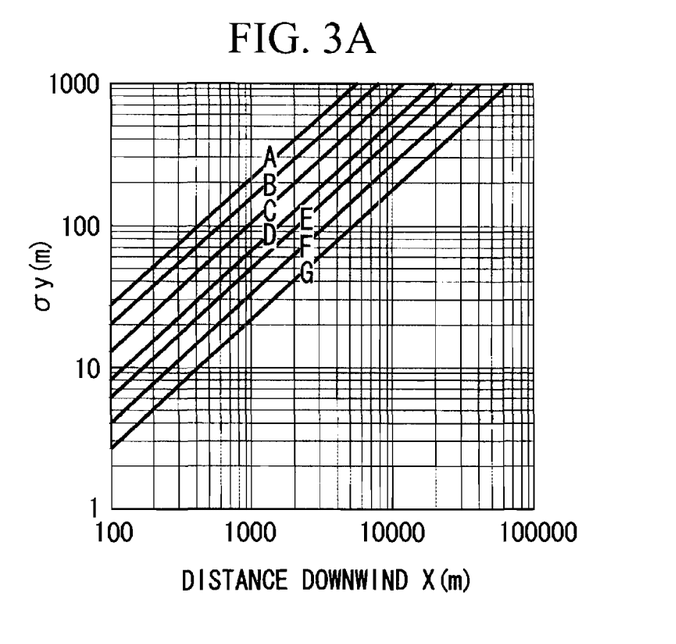
FIG. 3A is a diagram showing a Pasquill-Gifford diagram.
Figure 3B:
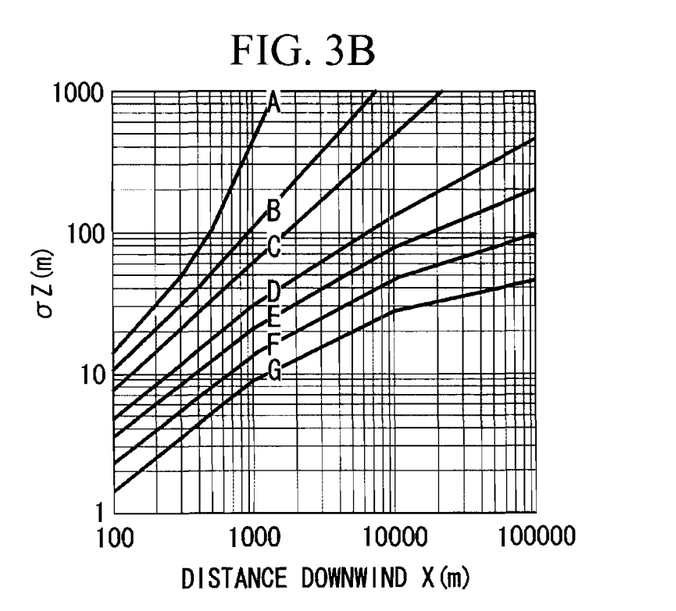
FIG. 3B is a diagram showing a Pasquill-Gifford diagram.

In this embodiment, the material diffusion widths $\sigma_x$, $\sigma_y$, and $\sigma_z$ along each of the axes in Equation (3) above are obtained from a Pasquill-Gifford diagram, like those shown in FIGS. 3A and 3B. The method of obtaining the diffusion widths $\sigma_x$, $\sigma_y$, and $\sigma_z$ can be arbitrarily determined; for example, they may be obtained by approximating the Pasquill-Gifford diagrams shown in FIGS. 3A and 3B.

Now, if it is assumed that a certain disaster victim $P_1$ at a prescribed time $t_1$ had already fallen at position information $(x_1, y_1)$, the exposure amount at this position $(x_1, y_1)$ can be regarded as being an amount sufficient to pose a danger to human life. From this assumption, an area having an exposure amount greater than or equal to the exposure amount at position $(x_1, y_1)$ can be regarded as a disaster-affected area, in other words, an area posing a danger to human life.

Thus, in this embodiment, the exposure amount posing a danger to human life is estimated on the basis of the position information where a disaster victim has fallen, and the area having an exposure amount greater than or equal to this exposure amount is estimated as being the disaster-affected area. Since the diffusion state of a harmful substance changes depending on the wind direction, wind direction information is also used, in addition to the above-described position information of disaster victims.

More concretely, if the position information $(x_1, y_1)$ of the disaster victim $P_1$ and the wind direction are given, Equation (3) above can be given by Equation (4) below, and the value of $K_1$ is derived.

{Formula 4}

$$K_1 \equiv \frac{1}{\alpha_y \alpha_z x_1^2 U} \exp\left(-\frac{y_1^2}{2\alpha_y^2 x_1^2}\right) c(x_1, t_1) \qquad (4)$$

Then, by applying this $K_1$ again to f(x, y, t) shown in Equation (3) above, Equation (5) below is obtained.

{Formula 5}

$$K_1 = \frac{1}{\sigma_y \sigma_z U} \exp\left(-\frac{y^2}{2\alpha_y^2 x^2}\right) c(x, t) = f(x, y, t) \qquad (5)$$

Figure 4:
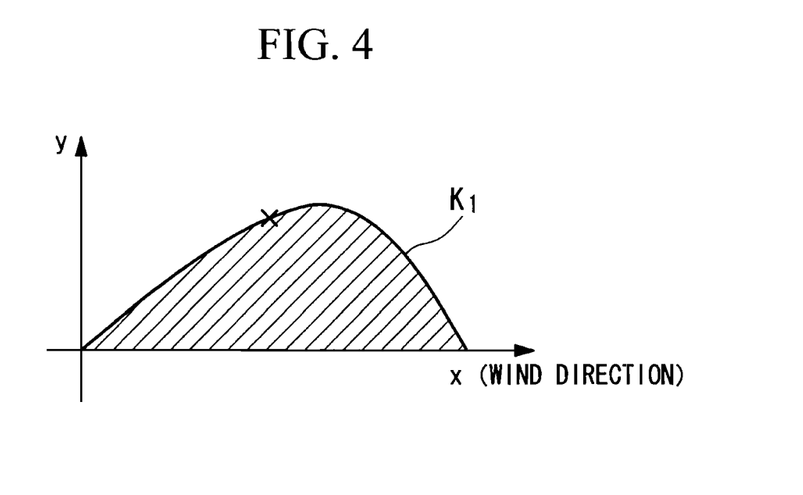
FIG. 4 is a diagram showing an example of an exposure characteristic and a disaster-affected area.

The curve represented by Equation (5) above (hereinafter referred to as "exposure characteristic") is shown in FIG. 4. In FIG. 4, the x-axis is an axis that passes through the position of a disaster victim located farthest upwind and that is parallel to the wind direction, and the y-axis is an axis that passes through the position of the disaster victim located farthest upwind and that is perpendicular to the x-axis. The exposure characteristic can be defined as the curve obtained by joining points having the same exposure amount as position $(x_1, y_1)$, and the region bounded by the x-axis and the exposure characteristic (the hatched region in FIG. 4) indicates an area having exposure amounts the same value as that at the position of the disaster victim $P_1$ and larger exposure amounts at a prescribed time $t_1$, in other words, the disaster-affected area.

Figure 5:
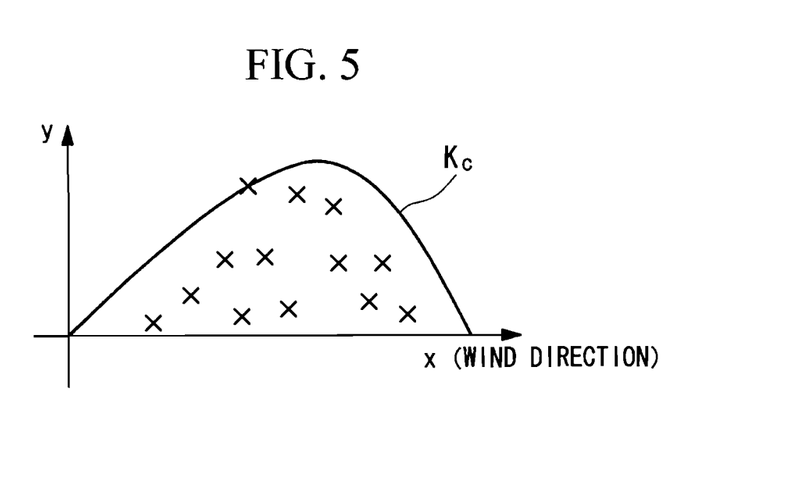
FIG. 5 is a diagram for explaining a method of obtaining a critical value of the exposure amount.

The disaster-affected area shown in FIG. 4 is a disaster-affected area determined on the basis of, as far as possible, only the position information of the disaster victim $P_1$, and, even though the exposure amount is small, the possibility of posing a danger to human life cannot be ruled out. Thus, it is necessary to determine a critical value of the exposure amount that poses a danger to human life. To determine this critical value, as shown in FIG. 5, it suffices to plot the position information $(x_i, y_i$ (i=1, 2, ..., n)) of other disaster victims $P_2$, $P_3$, ..., $P_N$ at a prescribed time $t_1$ in an xy orthogonal coordinate system, and to determine the minimum envelope Kc=f(x, y, t) that encloses all of the plotted position information. This envelope Kc=f(x, y, t) can be regarded as the critical value of the exposure amount at a prescribed time $t_1$.

Next, the device configuration of the disaster-affected area estimation device 10 according to this embodiment will be described more concretely.

Figure 1:
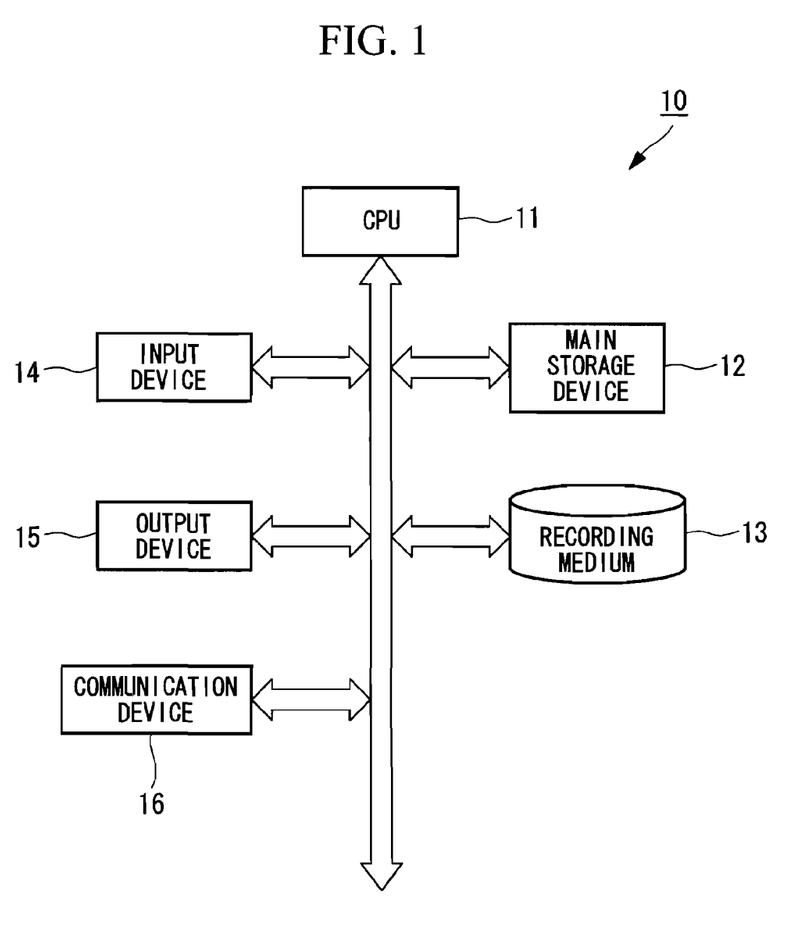
FIG. 1 is a block diagram showing, in outline, the configuration of a disaster-affected area estimation device according to a first embodiment of the present invention.

The disaster-affected area estimation device 10 according to this embodiment, as described above, is a device for performing estimation of a disaster-affected area when a disaster occurs, prediction regarding subsequent expansion of the disaster-affected area, and so forth. The disaster-affected area estimation device 10 includes a computer system (computing device system), as shown in FIG. 1, for example, and has a configuration provided with a CPU (central processing unit) 11, a main storage device 12 such as a RAM (Random Access Memory), an auxiliary storage device 13, an input device 14 such as a keyboard or a mouse, an output device 15 such as a display or printer, a communication device 16 that performs transmission and reception of information by performing communication with an external device, and so forth.

The auxiliary storage device 13 is a computer-readable recording medium, for example, a magnetic disk, a magneto-optical disk, a CD-ROM, a DVD-ROM, a semiconductor memory or the like. Various programs (for example, a disaster-affected area estimation program) are stored in this auxiliary storage device 13, and the various types of processing are implemented by the CPU 11 loading programs from the auxiliary storage device 13 into the main storage device 12 and executing them.

Figure 2:
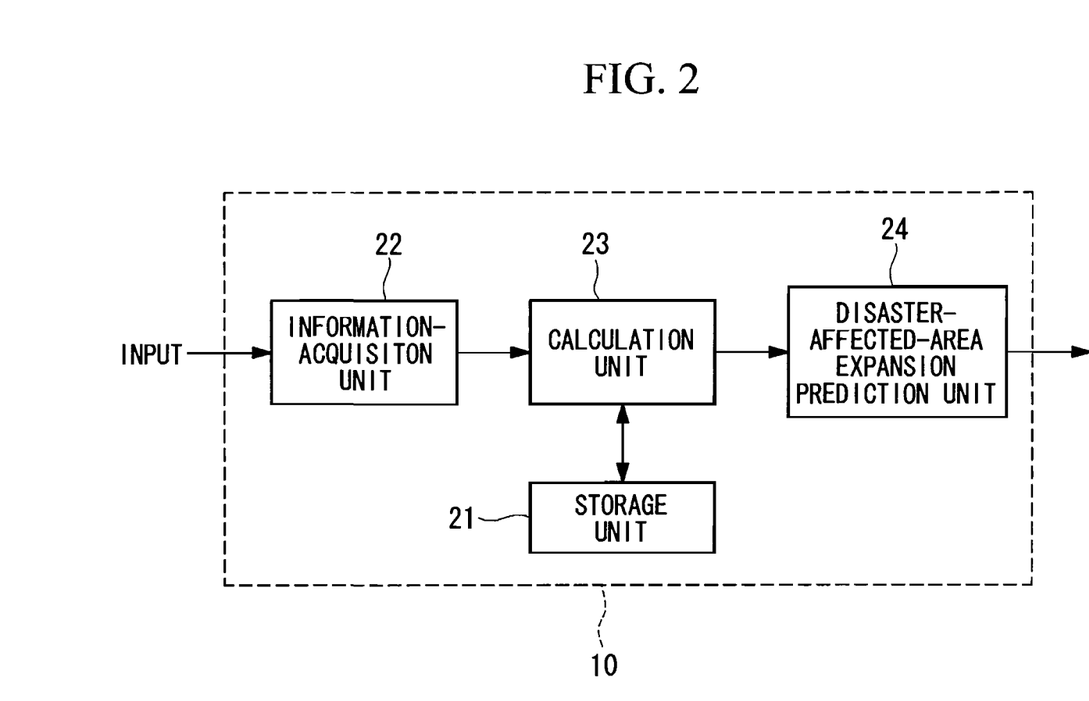
FIG. 2 is a functional block diagram showing, in expanded fashion, the functions provided in the disaster-affected area estimation device according to the first embodiment of the present invention.

FIG. 2 is a functional block diagram showing, in expanded fashion, the functions provided in the disaster-affected area estimation device 10. As shown in FIG. 2, the disaster-affected area estimation device 10 includes a storage unit 21 that stores an exposure calculation formula representing the exposure amount at a certain time and certain position, using the diffusivity and flow rate (wind speed) of the material; an information-acquisition unit 22 that acquires position information of disaster victims at a prescribed time as input information; a calculation unit 23 that determines a critical value of the exposure amount, by applying the position information of each disaster victim and prescribed time to the exposure calculation formula, and that specifies the exposure calculation formula for when the critical value is obtained as a critical calculation formula; and a disaster-affected-area expansion prediction unit 24.

More specifically, the exposure calculation formula represented by Equation (6) below is stored in the storage unit 21.

{Formula 6}

$$K = \frac{1}{\sigma_y \sigma_z U} \exp\left(-\frac{y^2}{2\alpha_y^2 x^2}\right) c(x, t) = f(x, y, t) \quad (6)$$

The information-acquisition unit 22 acquires position information of disaster victims, the wind direction, etc. at a prescribed time, which is input, as input information, via the input device 14, such as a keyboard, or received via the communication device 16, and outputs this input information to the calculating unit 23.

The calculating unit 23 determines the critical value of the exposure amount by using the input information input from the information-acquisition unit 22 and the exposure calculation formula stored in the storage unit 21. Specifically, in an area obtained with a normalized exposure calculation formula which encloses the positions of all disaster victims input as the input information, the calculation unit 23 assumes the position information located farthest upwind as the origin and defines the axis passing through this origin and parallel to the wind direction as the x-axis. The area mentioned above may be determined automatically by the calculation unit 23 on the basis of a predetermined algorithm or may be determined by the user (for example, staff at the center) operating the input device. Also, an axis orthogonal to this x-axis and passing through the origin is defined as the y-axis. Once an xy orthogonal coordinate system is defined in this way, the calculation unit 23 then obtains the K value in Equation (6) above at the position of each disaster victim, specifies the minimum value of the obtained K values as the critical value, that is, a parameter indicating the minimum exposure amount that poses a danger to human life, and specifies, as the disaster-affected area, the area represented by the exposure calculation formula (hereinafter referred to as "critical exposure calculation formula") for when this critical value is obtained. In FIGS. 4 and 5 described above, the disaster-affected area is shown only in the range $0 \leq y$; in practice, however, the disaster affected can be regarded as widening symmetrically with respect to the x-axis also in the range $y < 0$. Therefore, the disaster-affected area in practice is the entire area obtained when the disaster-affected area represented by the critical exposure calculation formula is drawn symmetrically with respect to the y-axis.

The disaster-affected-area expansion prediction unit 24 performs prediction regarding expansion of the disaster-affected area from a prescribed time $t_1$ onward, by inputting a time from the prescribed time $t_1$ onward as a time parameter to the critical exposure calculation formula obtained by the calculation unit 23.

Next, the operation of the disaster-affected area estimation device 10 having the above configuration will be described.

When a disaster occurs, position information of disaster victims in the disaster area is collected, for example, by rescue workers etc. in the disaster area, and this information is reported to, for example, a disaster center that monitors the state of the disaster. For example, the disaster-affected area estimation device 10 is installed at the disaster center, and the input device 14 of the disaster-affected area estimation device 10 is operated by center staff etc. at the disaster center to input position information of the disaster victims. The center staff input the wind direction in the disaster area at that time via the input device 14.

This input information input via the input device 14 is acquired by the information-acquisition unit 22 and is output to the calculation unit 23. The K value for the position information of each disaster victim is calculated in the calculation unit 23 by using the exposure calculation formula represented by Equation (6) above, which is stored in the storage unit 21. Then, the minimum value among the plurality of calculated K values is extracted as the critical value, and the calculation formula for when this critical value is shown is specified as the critical calculation formula.

Figure 6:
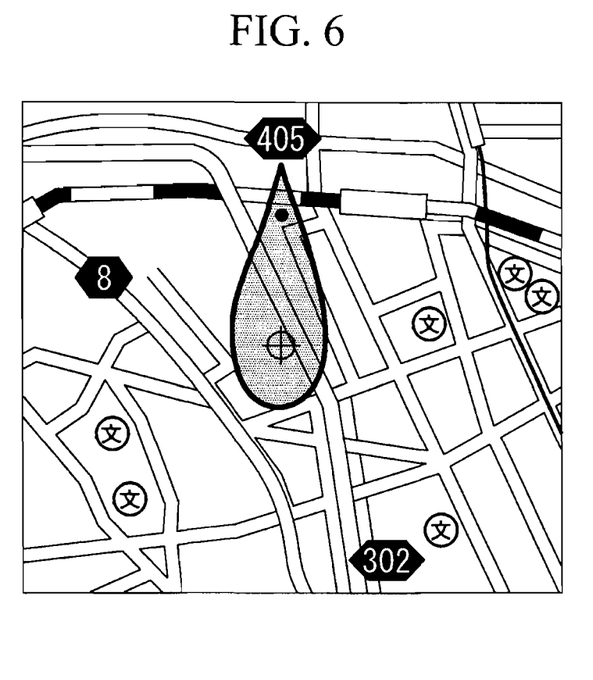
FIG. 6 is a diagram showing a display example of the disaster-affected area.

Once the critical calculation formula is specified, the area represented by this critical calculation formula is drawn on a map of the disaster area, thereby displaying the disaster-affected area at the prescribed time $t_1$ on the output device 15, such as a liquid crystal display, as shown in FIG. 6. The disaster-affected area shown here is, as described above, the entire area obtained when the disaster-affected area for the range $0 \leq y$ represented by the critical exposure calculation formula is drawn symmetrically with respect to the y-axis.

Furthermore, the above-described critical calculation formula is supplied from the calculation unit 23 to the disaster-affected-area expansion prediction unit 24, and a time from the prescribed time $t_1$ onward is applied to the critical calculation formula by the disaster-affected-area expansion prediction unit 24, thereby performing prediction regarding expansion of the disaster-affected area. Specifically, because the critical calculation formula includes the time t and the position information (x, y) as variable parameters, as shown in Equation (6), if time information is supplied, it is possible to obtain the disaster-affected area at that time.

Figure 7:
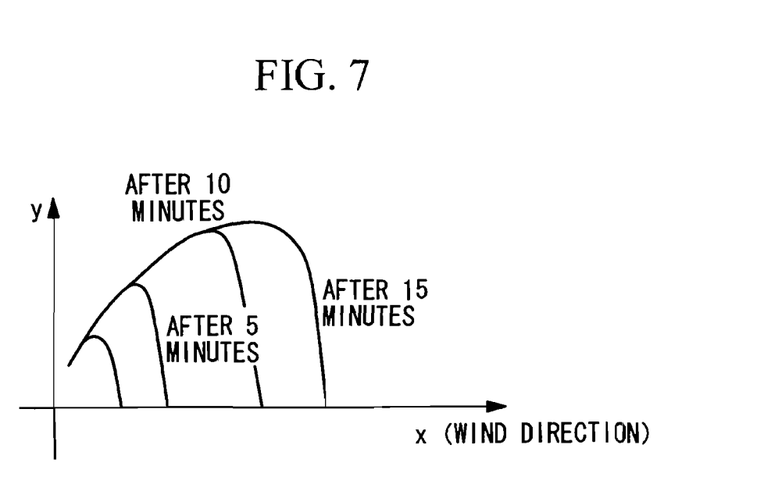
FIG. 7 is a diagram showing the expansion state of a disaster-affected area at a prescribed time, and 5 minutes, 10 minutes, and 15 minutes after the prescribed time.

FIG. 7 shows the expansion state of the disaster-affected area at a prescribed time, and 5 minutes, 10 minutes, and 15 minutes after the prescribed time (only the range $0 \leq y$). A decreasing K value, i.e., the critical value, is regarded as posing a danger to human life, even for a small exposure amount, and therefore, a decreasing K value can be regarded as an increasing disaster-affected area.

If the wind direction changes with time, the x-axis and y-axis may be assumed to rotate according to the wind direction. By doing so, it is possible to perform prediction regarding expansion of the disaster-affected area with even higher reliability.

As described above, with the disaster-affected area estimation device according to this embodiment, the exposure calculation formula is obtained by time integrating the concentration distribution obtained from the Puff model based on the flat-land, uniform-flow limit. By applying the position information of the disaster victims and the wind direction to this exposure calculation formula, the critical value of the exposure amount is derived, and the disaster-affected area is estimated on the basis of this critical value of the exposure amount. In this case, with the disaster-affected area estimation device according to this embodiment, because only the wind direction and the position information of the disaster victims are required as input information, it is possible to perform estimation of the disaster-affected area rapidly on the basis of the information that can be readily collected on-site in the disaster area.

Since the disaster-affected area is estimated on the basis of the position information of the disaster victims, the disaster-affected area estimation device according to this embodiment estimates the disaster-affected area from the time when position information of the disaster victims could be collected (for example, the prescribed time $t_1$ described above) onward, and information before that time, for example, particularly detailed information about the disaster occurrence location and disaster occurrence time, is not required.

What is most important when a disaster occurs is to rapidly perform estimation of the disaster-affected area at that time and prediction regarding the expansion thereof, and specifying the disaster occurrence location and time, which may be analyzed later, is of low importance compared with the former. Thus, the disaster-affected area estimation device according to this embodiment can more rapidly estimate the information that is most needed when a disaster occurs and yields effective results in the field.

In this embodiment, the level of damage is not particularly categorized, and all casualties are treated as disaster victims. Instead of this, a critical value to which disaster victims of each disaster level are exposed may be determined. For example, by supplying position information of fatalities at a prescribed time, a critical value of the exposure amount having a possibility of causing death (hereinafter referred to as "first critical value") is obtained. By defining a region having exposure amounts greater than or equal to this first critical value as a death-level area and applying position information of disaster victims who are confirmed not to be dead but who are significantly affected (for example, those who are unconscious, etc.), a critical value of the exposure amount that causes a significant effect on the human body (hereinafter referred to as "second critical value") is obtained. Regions having the second critical value or higher but less than the first critical value are estimated as being dangerous regions. Thus a level may be assigned to the degree of the effect, and a disaster-affected area may be estimated for each level. By displaying the area of each level on a map in a different color (for example, death-level areas in red, dangerous areas in orange, etc.), information that is extremely easy to understand can be provided to monitoring personnel in the disaster center, etc.

In the embodiment described above, a description has been given of a case where the center staff directly input information via the input device 14; however, the position information of the disaster victims may be transmitted by rescue workers on-site in the disaster area via a communication medium and received via the communication device 16, and the information-acquisition unit 22 may acquire this information. The same applies to the wind direction information; for example, the communication device 16 may periodically access a database at a meteorological agency to receive wind direction information for a certain period from the past to the future.

Second Embodiment

Next, a disaster-affected area estimation device according to the second embodiment of the present invention will be described.

Figure 8:
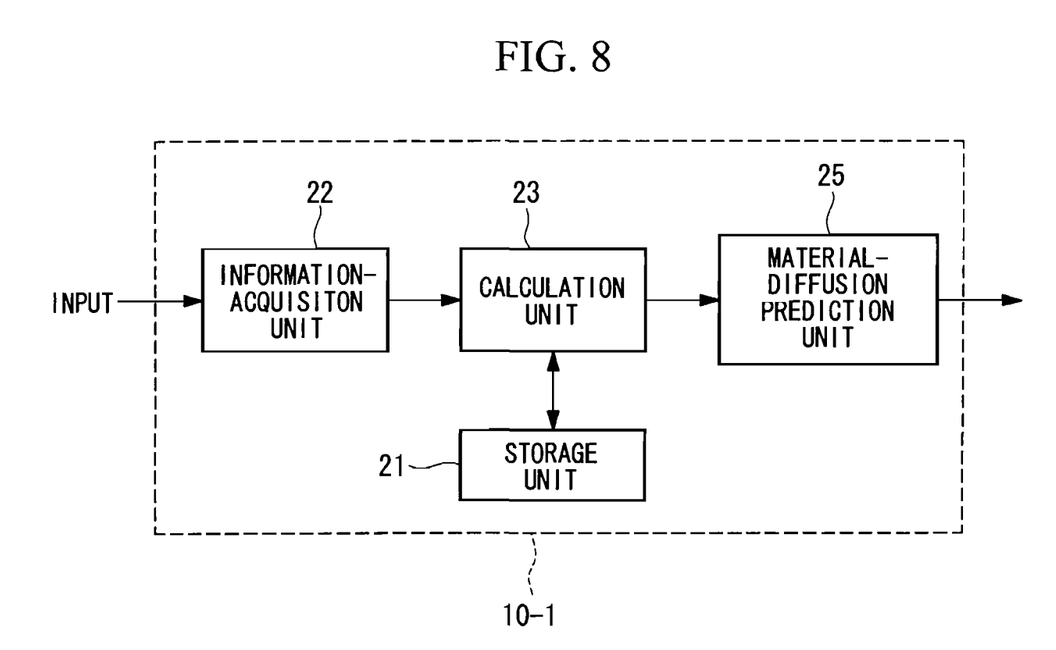
FIG. 8 is a functional block diagram showing, in expanded fashion, the functions provided in a disaster-affected area estimation device according to a second embodiment of the present invention.

FIG. 8 is a functional block diagram showing, in expanded fashion, the functions provided in a disaster-affected area estimation device according to this embodiment.

As shown in FIG. 8, a disaster-affected area estimation device 10-1 according to this embodiment is provided with a material-diffusion prediction unit 25 instead of the disaster-affected-area expansion prediction unit 24 in the disaster-affected area estimation device 10 according to the first embodiment described above. In the disaster-affected area estimation device 10 described above, a uniform flow is presumed as the air-flow field, and damage prediction is performed using an extremely simple method; this embodiment, however, performs more detailed diffusion analysis of the material diffusion prediction from the prescribed time onward, in which weather data, regional data, etc. are reflected, and performs prediction regarding expansion of the disaster-affected area on the basis of the results thereof. In the following description of the disaster-affected area estimation device 10-1, a description of commonalities with the first embodiment will be omitted, and mainly the differences will be described.

When the calculation unit 23 obtains the critical calculation formula with the method described above, it outputs this critical calculation formula to the material-diffusion prediction unit 25. The material-diffusion prediction unit 25 determines the spatial concentration distribution at a prescribed time using this critical calculation formula.

The spatial concentration distribution at the prescribed time $t_1$ (for example, in the case of release over land) is given by Equation (7) below.

{Formula 7}

$$\frac{C}{Q} = \frac{1}{\sigma_x \sigma_y \sigma_z} \exp\left(-\frac{(x-Ut)^2}{2\sigma_x^2}\right) \exp\left(-\frac{y^2}{2\sigma_y^2}\right) \exp\left(-\frac{z^2}{2\sigma_z^2}\right) \quad (7)$$

Equation (7) means a normal distribution with standard deviations $\sigma_x$, $\sigma_y$, and $\sigma_z$, and therefore, it suffices to disperse of particles in a normal distribution centered on $x_1 = Ut_1$. Representing this as an equation yields Equation (8) below.

{Formula 8}

$$\delta x = \text{norm}(\sigma_x), \delta y = \text{norm}(\sigma_y), \delta z = |\text{norm}(\sigma_z)|,$$

$$x_j = Ut_1 + \delta x, y_j = \delta y, z_j = \delta z \quad (8)$$

Figure 9A:
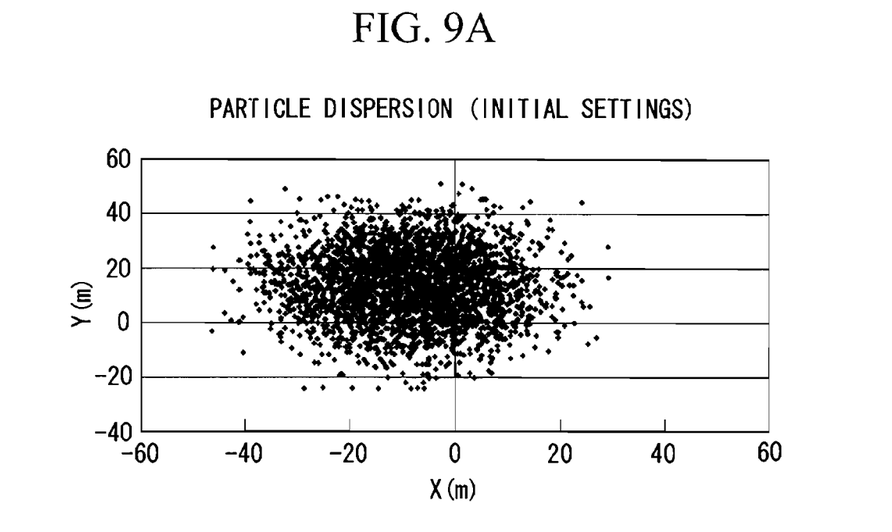
FIG. 9A is a diagram showing an example of a spatial concentration distribution at a prescribed time.
Figure 9B:
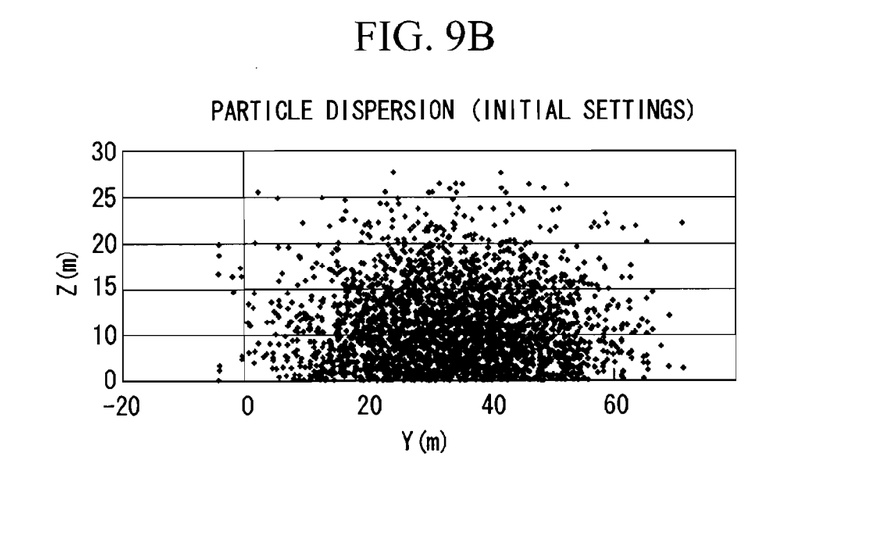
FIG. 9B is a diagram showing an example of a spatial concentration distribution at a prescribed time.

In Equation (8) above, norm( ) indicates a normal random number. The spatial concentration distribution at a prescribed time $t_1$ represented by Equation (8) above is shown in FIG. 9A and FIG. 9B. FIG. 9A shows the spatial concentration distribution in a horizontal plane (xy orthogonal coordinates), and FIG. 9B shows the spatial concentration distribution in a vertical plane (yz orthogonal coordinates).

When analyzing the material diffusion prediction in detail, besides the spatial concentration distribution described above, it is necessary to set the strength (amount) of each released particle. This is obtained from Equation (2) above.

Specifically, what is obtained in the detailed diffusion prediction is the distribution of the exposure amount D, and what is essential now is the distribution of the exposure characteristic value K (K value). From Equation (2) above, the exposure amount D when the condition in Equation (9) below is given becomes the K value.

{Formula 9}

$$\overline{Q} = 1 \tag{9}$$

Therefore, when n is defined as the number of released particles, the strength per particle is given by Equation (10) below.

{Formula 10}

$$Q_0 = Q/n = \overline{Q}\sqrt{2\pi^3}/2n = 7.87/n \tag{10}$$

Once the spatial concentration distribution and the strength of the released particles at the prescribed time $t_1$ are obtained in this way, with these serving as initial values, the diffusion prediction of the released particles from the prescribed time $t_1$ onward is performed.

The diffusion prediction of the released particles calculates the air-flow field at the disaster area at the prediction time from, for example, the topography at the disaster area and the weather data at the prediction time. It is predicted how each of the released particles diffuse at the disaster area on the basis of this air-flow field and spatial concentration distribution.

Furthermore, the exposure characteristic value K at each site is calculated by time integrating this diffusion state. By comparing this exposure amount and the above-described critical value of the exposure amount at the prescribed time $t_1$, the area having an exposure amount equal to or greater than the critical value of the exposure amount is specified. Thus, it is possible to estimate the disaster-affected area at the prediction time.

Thus, by varying the prediction time, it is possible to estimate the disaster-affected area at each time, and by doing so, it is possible to perform prediction regarding how the disaster-affected area widens, that is, prediction regarding expansion of the disaster-affected area. The material diffusion prediction method is a known technique, for example, like that disclosed in Patent Literature 1, and therefore, a detailed description thereof is omitted.

With the disaster-affected area estimation device according to this embodiment, the diffusion state of the released particles is estimated by taking account of the topography, detailed wind direction, etc. at the disaster area, and prediction regarding expansion of the disaster-affected area is performed on the basis thereof; therefore, it is possible to increase the analysis precision compared with the disaster-affected area estimation device according to the first embodiment described above.

Third Embodiment

Next, a disaster-affected area estimation device according to a third embodiment of the present invention will be described.

Figure 10:
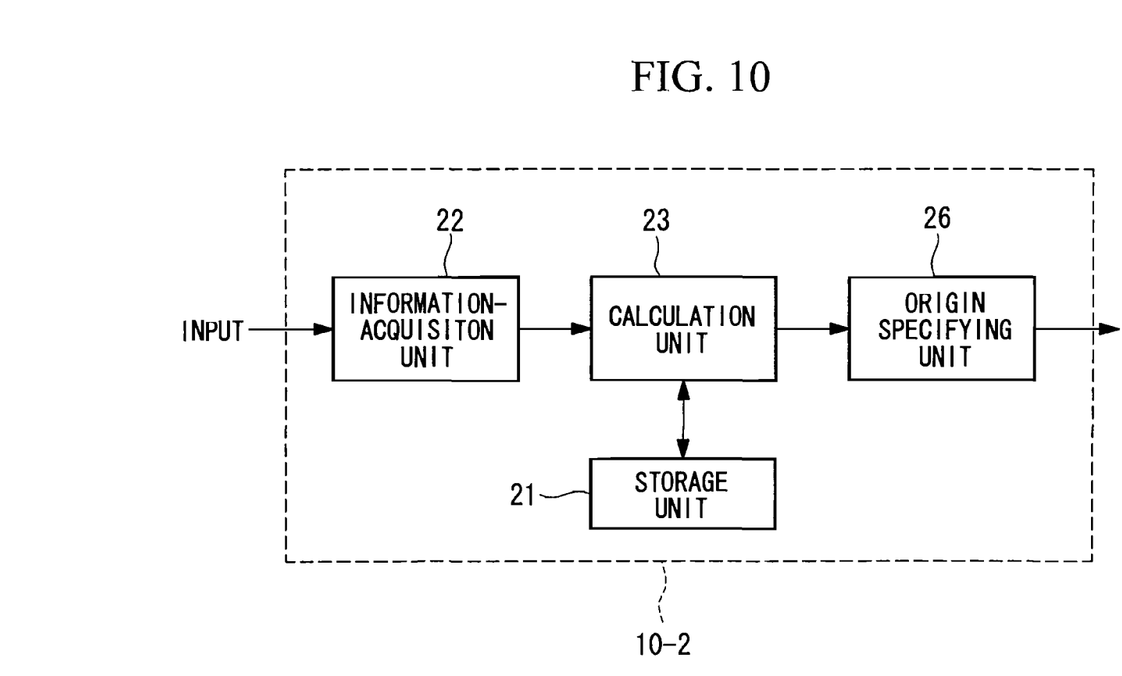
FIG. 10 is a functional block diagram showing, in expanded fashion, the functions provided in a disaster-affected area estimation device according to a third embodiment of the present invention.

FIG. 10 is a functional block diagram showing, in expanded fashion, the functions provided in the disaster-affected area estimation device according to this embodiment.

A disaster-affected area estimation device 10-2 according to this embodiment differs from the disaster-affected area estimation device 10 according to the first embodiment described above in that it includes an origin specifying unit 26 that estimates a disaster occurrence location and disaster occurrence time from a disaster-affected area at a prescribed time $t_1$ obtained by the calculation unit 23.

The method of estimating the disaster occurrence location and disaster occurrence time performed by the origin specifying unit 26 will be described here.

First, defining the disaster occurrence location as $(x_0, y_0)$ and the disaster occurrence time as $t_0$, Equation (3) above becomes Equation (11) below.

{Formula 11}

$$K = \frac{1}{\alpha_y \alpha_z (x-x_0)^2 U} \exp\left(-\frac{(y-y_0)^2}{2\alpha_y^2(x-x_0)^2}\right) c(x-x_0, t-t_0) \tag{11}$$

$$c(x-x_0, t-t_0) = \int_\xi^{\xi_0} \exp\left(-\frac{\xi^2}{2}\right) d\xi,$$

$$\xi = \frac{x-x_0 - U(t-t_0)}{\sigma_x}, \quad \xi_0 = \frac{x-x_0}{\sigma_x}$$

Figure 11:
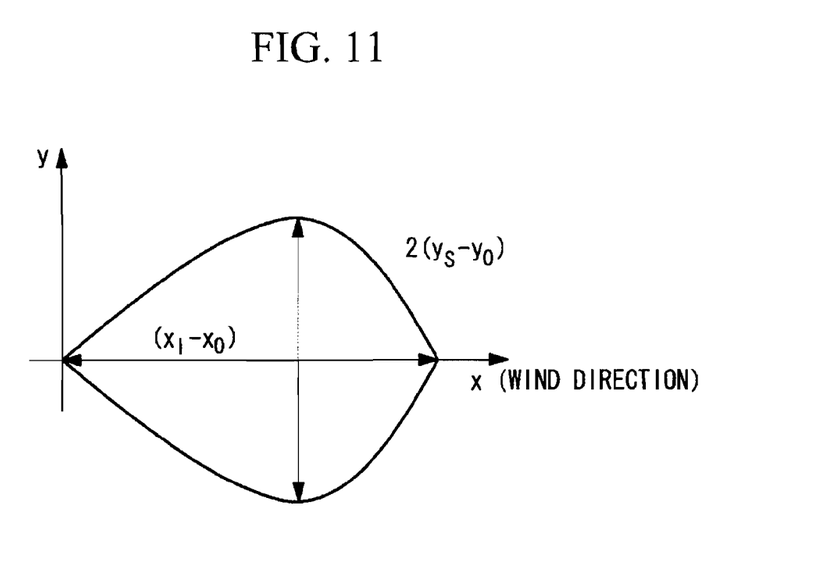
FIG. 11 is a diagram for explaining a long diameter and a short diameter.

A curve of Equation (11) above passes through $(x_0, y_0)$. In other words, the left extremity of the curve (exposure characteristic) can be regarded as the disaster occurrence location $(x_0, y_0)$. Now, as shown in FIG. 11, the curve (exposure characteristic) at time $t_1$ is copied so as to form an image in the x-axis, and with the long diameter and short diameter of the drawn shape defined as l and s, respectively, these are given by Equation (12) and Equation (13) below, from Equation (11) above.

{Formula 12}

$$l \equiv (x_l - x_0); K\alpha_y \alpha_z (x_l - x_0)^2 U = c(x_l - x_0, t_1 - t_0) \tag{12}$$

$$s \equiv 2(y_s - y_0); K\alpha_y \alpha_z (x_s - x_0)^2 U = e^{-\beta^2} c(x_s - x_0, t_1 - t_0) \tag{13}$$

e=2.718

注: at $y=y_0$: $K\alpha_y\alpha_z(x_l-x_0)^2 U = c(x_l-x_0, t_1-t_0)$ by y'=0: $(y_s - y_0) \approx \beta\sqrt{2}\alpha_y(x_s - x_0)$, $\beta = \sqrt{2}$: correctionfactor Therefore, by applying the long diameter and short diameter l and s based on the disaster-affected area (on-site information) as time $t_1$, the relationship represented by Equation (14) below is obtained from Equations (12) and (13).

{Formula 13}

$$K_{cr}\alpha_y\alpha_z l^2 U = c(l, t_1 - t_0), \quad K_{cr}\alpha_y\alpha_z \overline{s}^2 U = e^{-\beta^2} \cdot c(\overline{s}, t_1 - t_0)$$

$$\overline{s} \equiv s/(2\sqrt{2}\alpha_y\beta) \tag{14}$$

Then, $(t_1 - t_0)$ and $K_{cr}$ are determined from Equation (14) above. Specifically, eliminating K from Equation (14) above yields Equation (15).

{Formula 14}

$$f(\tau) \equiv c(l, \tau) - (l/\overline{s})^2 e^{-\beta^2} \cdot c(\overline{s}, \tau) = 0$$

$$\tau \equiv (t_1 - t_0) \tag{15}$$

Then, $\tau = (t_1 - t_0)$ is obtained from Equation (15) above, and $K_{cr}$ is obtained from Equation (14). Once $\tau = (t_1 - t_0)$ and $K_{cr}$ are obtained in this way, applying these values to Equations (12) and (13) above determines the long diameter l and short diameter s. Thus, the exposure characteristic is specified, and the origin ($x_0$, $y_0$) and $t_0$ of the exposure characteristic are determined.

As described above, the origin specifying unit possesses the above equations, and by applying the information about the disaster-affected area estimated by the calculation unit to these equations, the origin ($x_0$, $y_0$) and $t_0$ of the curve (exposure characteristic) traced by Equation (3) can be determined, and these can be specified as the disaster occurrence location and the disaster occurrence time.

As described above, with the disaster-affected area estimation device 10-2 according to this embodiment, by predicting the state before the prescribed time on the basis of the disaster-affected area at the prescribed time, obtained by the calculation unit 23, it is possible to specify the disaster occurrence location, as well as the time thereof. Accordingly, it is possible to perform analysis based on highly reliably information also for detailed material diffusion prediction, which requires, for example, the disaster occurrence location and disaster occurrence time.

In the respective embodiments described above, it is assumed that the disaster-affected-area expansion prediction unit 24, the material-diffusion prediction unit 25, and the origin specifying unit 26 are built into the disaster-affected area estimation device; instead of this, however, these units may be provided in a separate system from the disaster-affected-area expansion prediction unit 24. That is to say, the disaster-affected area estimation device may be provided with an output unit that outputs the critical calculation formula specified by the calculation unit 23 to an external device, and by supplying information about the critical calculation formula output from the output unit to the material-diffusion prediction unit etc. provided in a separate system, diffusion prediction etc. may be performed in a separate device. By providing the output unit in this way, it is possible to perform diffusion prediction etc. by employing an existing material prediction system. The disaster-affected-area expansion prediction unit 24, the material-diffusion prediction unit 25, and the origin specifying unit 26 can be combined arbitrarily. For example, the disaster-affected area estimation device in FIG. 10 may also include the origin specifying unit 26.

REFERENCE SIGNS LIST 10, 10-1, 10-2 disaster-affected area estimation device
11 CPU
12 main storage device
13 recording medium
14 input device
15 output device
16 communication device
21 storage unit
22 information-acquisition unit
23 calculation unit
24 disaster-affected-area expansion prediction unit
25 material-diffusion prediction unit
26 origin specifying unit

The invention claimed is:

1. A disaster-affected area estimation device for performing estimation of a disaster-affected area when a disaster occurs, comprising:
a storage unit that stores an exposure calculation formula expressing an exposure amount, which is an integrated value of the concentration of a material with respect to time, at a certain time and a certain position, by using a diffusivity and flow rate of the material;
an information-acquisition unit that acquires position information of disaster victims at a prescribed time as input information; and
a calculation unit that obtains a critical value of the exposure amount by applying the position information of each disaster victim at the prescribed time to the exposure calculation formula and that specifies the disaster-affected area at the prescribed time on the basis of the exposure calculation formula for when the critical value is obtained.

2. A disaster-affected area estimation device according to claim 1, wherein the calculation unit calculates the exposure amount at the positions of all disaster victims at the prescribed time by using the exposure calculation formula and defines the minimum exposure amount among all of the calculated exposure amounts as the critical value.

3. A disaster-affected area estimation device according to claim 1, wherein the calculation unit normalizes the exposure amounts by dividing the exposure amounts by an amount of material released and determines the critical value of the exposure amount by using a normalized formula.

4. A disaster-affected area estimation device according to claim 1, further comprising an output unit that outputs at least one of the exposure calculation formula for when the critical value is obtained and the estimated disaster-affected area.

5. A disaster-affected area estimation device according to claim 1, further comprising a disaster-affected-area expansion prediction unit that performs prediction regarding expansion of the disaster-affected area from the prescribed time onward, by substituting a time from the prescribed time onward into the exposure calculation formula for when the critical value is obtained.

6. A disaster-affected area estimation device according to claim 1, further comprising a material-diffusion prediction unit that obtains a concentration diffusion equation by time differentiating the exposure calculation formula for when the critical value is obtained, that performs material diffusion analysis by using a concentration distribution at the prescribed time, obtained with this concentration diffusion equation, as an initial concentration distribution, and that performs material diffusion prediction for the prescribed time onward.

7. A disaster-affected area estimation device according to claim 1, further comprising an origin specifying unit that determines, with reference to the prescribed time, a material release location before the prescribed time by using the exposure calculation formula for when the critical value is obtained.

8. A disaster-affected area estimation program for performing estimation of a disaster-affected area when a disaster occurs, comprising:
information acquisition processing for acquiring position information of disaster victims at a prescribed time as input information;
calculation processing for obtaining a critical value of an exposure amount by applying the position information of each disaster victim at the prescribed time to an exposure calculation formula expressing the exposure amount, which is an integrated value of a concentration of a material with respect to time, at a certain time and a certain position, by using a diffusivity and flow rate of the material, and for specifying the disaster-affected area at the prescribed time on the basis of the exposure calculation formula for when the critical value is obtained.

* * * * *